J. S. BROOKS.

Improvement in Stove-Boards or Platforms.

No. 5,106. Reissued Oct. 22, 1872.

Witnesses.
Archie Paine
Charles Engel

Inventor.
John S. Brooks,
per R. F. Osgood,
atty.

A.M. PHOTO-LITHOGRAPHIC CO. N.Y. (OSBORNE'S PROCESS.)

UNITED STATES PATENT OFFICE.

JOHN S. BROOKS, OF ROCHESTER, NEW YORK, ASSIGNOR, BY MESNE ASSIGNMENTS, TO BROOKS AND WADSWORTH, OF SAME PLACE.

IMPROVEMENT IN STOVE BOARDS OR PLATFORMS.

Specification forming part of Letters Patent No. 127,455, dated June 4, 1872; reissue No. 5,106, dated October 22, 1872.

*To all whom it may concern:*

Figure 1:
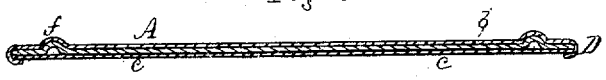
Figure 2:
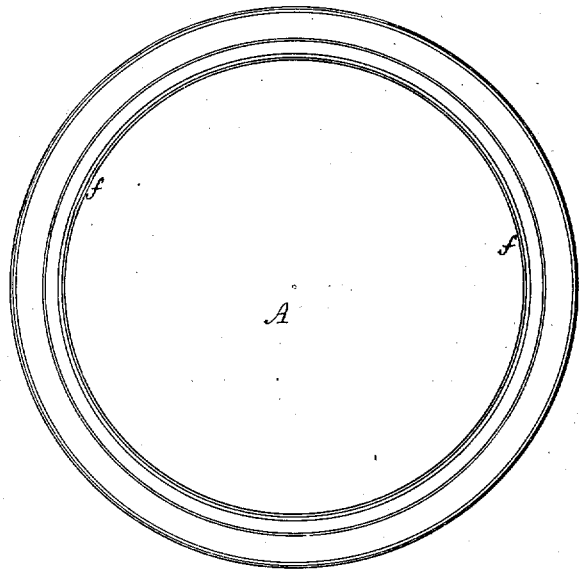

Be it known that I, JOHN S. BROOKS, of Rochester, in the county of Monroe and State of New York, have invented a certain Improvement in Stove-Boards, of which the following is a specification:

Figure 1 is a section through the center of the board, and Fig. 2 is a top view.

My improvement consists in combining an upper sheet or disk, of zinc or any suitable non-conducting metal, and an under one, of sheet-iron or any other cheap metal of a nature harder than that of the upper one. It also consists in combining with said parts a paper lining at the bottom; and, furthermore, in striking up or beading through both thicknesses of metal, as hereinafter described.

The parts may be held together by turning the edge of the upper disk over the edge of the under side, as shown in Fig. 1, at the end letter D. They should be cut into any form best suited to the shape of the stove-base they are used under, and may be ornamented by stamping or any other suitable way. When they are used under parlor-stoves, upon carpets, they may have a paper lining added and held in place by the edges also, as shown at *c c*. The upper sheet is shown at A, and the hard-metal sheet is shown at *b b*. The object of the sheet *b b* is to stiffen the board and prevent the marking or denting of the surface A by the stove-legs, or by the unevenness of the flooring, or by the general use of the board. It is also a preventive from fires, as in some cases stove bottoms become so much heated as to melt zinc and burn the floor, or at least to injure the carpets. The edge being turned or hemmed has a better finish and will lie more flatly on the floor than where only the raw edge of the metal is exposed.

The improvement is easily and cheaply made. Pieces of sheet-iron may be used where the feet of the stove rest, without covering the whole of the under surface. This stove-board can be made very thin and still have the necessary stiffness and strength. An ordinary board or stove support constructed in the usual way makes great thickness and stands high, which is unsightly, and it renders washing or dusting difficult to perform. This device is cheap, costing not more than a wooden board does. The edge of the zinc can be spun or turned around the rim, and make a good finish no matter what is the form. It may be square or oblong, which cannot be done with wood unless the same is of circular form. The sheet-iron prevents denting by the stove-legs. Its hardness resists the impressions, since the parts fit close together. Wood is soft and presents no resistance to indentations.

This combination allows beads *f* and other forms to be struck up on the board to preserve their shape. Such beads or forms are struck through both the iron and zinc thicknesses, and as they fit together closely no flattening down can take place. Zinc alone will not retain its place when beaded, and wood is no protection to the beading.

*Claims.*

1. As a new article of manufacture the improved stove-board, made of the lower hard-metal sheet *b* and the upper non-conducting metal sheet A, for the purpose specified, the two being united, substantially as herein shown and described.

2. As a new article of manufacture the improved stove-board herein shown and described, consisting of the upper disk A, hard-metal disk *b*, and paper lining *c*, the same being secured together by turning the edge of the upper disk over the edge of the under side.

3. In a stove-board, consisting of two sheets of metal, I claim the beads *f* formed by stamping, rolling, or striking through both sheets, as and for the purpose specified.

In witness whereof I have hereunto signed my name in the presence of two subscribing witnesses.

JOHN S. BROOKS.

Witnesses:

ARCHIE BAINE,

R. F. OSGOOD.